United States Patent
Ljung

(10) Patent No.: US 9,843,971 B2
(45) Date of Patent: Dec. 12, 2017

(54) METHOD FOR OPERATING A MOBILE DEVICE

(71) Applicant: Sony Mobile Communications AB, Lund (SE)

(72) Inventor: Rickard Ljung, Helsingborg (SE)

(73) Assignee: Sony Mobile Communications AB, Lund (SE)

( * ) Notice: Subject to any disclaimer, the term of this patent is extended or adjusted under 35 U.S.C. 154(b) by 0 days.

(21) Appl. No.: 14/762,146

(22) PCT Filed: Jan. 13, 2014

(86) PCT No.: PCT/EP2014/050447
§ 371 (c)(1),
(2) Date: Jul. 20, 2015

(87) PCT Pub. No.: WO2014/111329
PCT Pub. Date: Jul. 24, 2014

(65) Prior Publication Data
US 2015/0358867 A1    Dec. 10, 2015
US 2017/0156089 A9    Jun. 1, 2017

(30) Foreign Application Priority Data
Jan. 21, 2013   (EP) .................................... 13000295

(51) Int. Cl.
*H04W 36/00*   (2009.01)
(52) U.S. Cl.
CPC .............................. *H04W 36/0061* (2013.01)

(58) Field of Classification Search
CPC . H04W 36/0061; H04W 92/18; H04W 88/04; H04W 76/023
See application file for complete search history.

(56) References Cited

U.S. PATENT DOCUMENTS

2010/0169498 A1* 7/2010 Palanki ................. H04W 16/14
709/228
2013/0170414 A1* 7/2013 Kwon ................. H04W 72/042
370/311

(Continued)

FOREIGN PATENT DOCUMENTS

WO    WO-2013/002688 A1    1/2013

OTHER PUBLICATIONS

International Search Report/Written Opinion for PCT/EP2014/050447 dated Mar. 12, 2014.

(Continued)

*Primary Examiner* — Kenneth Lam
(74) *Attorney, Agent, or Firm* — Wolf, Greenfield & Sacks, P.C.

(57) ABSTRACT

The present invention relates to a method for operating a mobile device (24) comprising an interface unit (31) for interfacing to a cellular communication network comprising a plurality of cells (12, 13) and for interfacing directly to another mobile device (25) within a transmission range (62) of the mobile device (24). According to the method, at least one reachable cell (12) of the communication network within the transmission range (62) of the mobile device (24) is detected by the mobile device (24), and a cell information concerning the at least one cell (12) is transmitted to the other mobile device (25) via a direct communication (51).

14 Claims, 2 Drawing Sheets

(56) References Cited

U.S. PATENT DOCUMENTS

| | | | | |
|---|---|---|---|---|
| 2013/0322388 A1* | 12/2013 | Ahn | ............... | H04W 76/023 370/329 |
| 2014/0029471 A1* | 1/2014 | Tavildar | ............... | H04W 48/16 370/255 |
| 2014/0099950 A1* | 4/2014 | Mildh | ............... | H04W 56/001 455/434 |
| 2014/0187283 A1* | 7/2014 | Nimbalker | ............... | H04W 72/048 455/550.1 |
| 2014/0206322 A1* | 7/2014 | Dimou | ............... | H04W 4/005 455/414.1 |
| 2015/0003440 A1* | 1/2015 | Lim | ............... | H04W 76/023 370/346 |
| 2015/0281940 A1* | 10/2015 | Yu | ............... | H04W 60/00 455/456.1 |
| 2015/0296443 A1* | 10/2015 | Lim | ............... | H04W 48/12 370/312 |
| 2015/0312952 A1* | 10/2015 | Fodor | ............... | H04W 72/1215 370/329 |

OTHER PUBLICATIONS

International Preliminary Report on Patentability and Written Opinion for PCT/EP2014/050447, dated Jul. 30, 2015.

* cited by examiner

METHOD FOR OPERATING A MOBILE DEVICE

CROSS-REFERENCE TO RELATED APPLICATION

This application is the National Phase under 35 U.S.C. §371 of PCT International Application No. PCT/EP2014/050447, filed Jan. 13, 2014, which claims priority to European Application No. 13000295.9, filed Jan. 21, 2013, the entire contents of the aforementioned applications are hereby incorporated herein by reference.

FIELD OF THE INVENTION

The present invention relates to a method for operating a mobile device, especially to a method for enhancing a cell change of a mobile device in a cell-based communication network. The present invention relates furthermore to mobile devices and a base station implementing the method for operating the mobile device.

BACKGROUND OF THE INVENTION

In commonly used public mobile communication systems the mobile devices are wirelessly connected to base stations and a communication between the mobile devices is done via at least one base station. The mobile devices, which will be called in the following also mobile terminals or simply terminals, may comprise for example mobile phones, especially so-called smartphones, personal digital assistants, mobile music players, tablet computers, laptop computers, notebook computers or navigation systems. The communication technologies of the mobile communication systems are specified by for example the 3rd Generation Partnership Project (3GPP) and the Long Term Evolution (LTE) standards. The principle is illustrated in FIG. 1. FIG. 1 shows two base stations 10 and 11 and eight mobile devices 21-28. Base station 10 provides a network communication cell 12 and base station 11 provides a network communication cell 13. A wireless or wired communication is provided between the base stations 10 and 11. The mobile devices 2124 are located within cell 12 and the mobile devices 25-28 are located within cell 13. A communication between two of the mobile devices 21-28 is accomplished by communication between the mobile device and the base station related to the cell in which the mobile device is located. In a communication between one of the mobile devices 21-24 and one of the mobile devices 25-28 both base stations 10 and 11 are involved. When a mobile device is moving from one cell to another cell, the mobile device registers at the base station assigned to the newly entered cell. The event of a mobile device moving from one cell to another cell is also called handover or cell change.

As one part of possible additions to the 3GPP standards for future versions and releases of the LTE and possibly WCDMA (Wideband Code Division Multiple Access) standard, it is considered to include a functionality for a so-called device-to-device communication. The device-to-device communication allows an information transmission directly between two mobile devices within a certain proximity. For example, in FIG. 1 a direct device-to-device communication could be performed between the mobile devices 22 and 23 or between the mobile devices 25 and 26 when the distance between these mobile devices is shorter than a radio transmission range of the mobile devices.

Furthermore, as part of the device cell change support functionalities, which are also called terminal mobility support functionalities, in the 3GPP standard, each base station is supposed to have knowledge about the identity of neighbor cells within the same geographical area. Referring to FIG. 1, base station 10 is supposed to have knowledge about the neighboring base station 11 and vice versa. The base stations can therefore publish candidate neighbor cell lists to the mobile devices in order to inform about suitable cells to analyze in case current signal quality is too low and the mobile device needs to change the cell. These cell lists can be filled in manually to each base station of each cell by an operator. Furthermore, there is an improved functionality included in the WCDMA and LTE standards which is called Automatic Neighbor Reporting (ANR). With the Automatic Neighbor Reporting the cell lists in the base stations can be updated by means of measurement reports from connected mobile devices. For example, a mobile device may detect available and suitable cells in a geographical area around the mobile device. This information may be transmitted to the base station the mobile device is currently registered at to update the neighbor cell lists in the base station. In return, the mobile devices receive the updated neighbor cell lists from the base station in order to be able to find suitable cells in case of a cell change and to avoid interference from unknown cells. However, in case the Automatic Neighbor Reporting functionality is not implemented or is updated too slowly compared to the rapid changes that may occur in the network, there may be new cells or other changes in the neighborhood which are not noticed and considered in the cell lists and thus the mobile devices are not aware of.

Therefore, there is a need for an improved neighbor cell reporting functionality.

SUMMARY OF THE INVENTION

According to the present invention, this object is achieved by a method for operating a mobile device as defined in claim 1 and claim 4, a method for operating a base station of a cell of a cellular communication network as defined in claim 6, a mobile device as defined in claim 8 and claim 9, a base station as defined in claim 12, and a combination of a mobile device and a base station as defined in claim 14. The dependent claims define preferred and advantageous embodiments of the invention.

According to an aspect of the present invention, a method for operating a mobile device is provided. The mobile device comprises an interface unit for interfacing to a cellular communication network. The communication network comprises a plurality of cells. The cellular communication network may comprise for example a cellular communication network of the second, third or fourth generation (2G, 3G or 4G). The interface unit is furthermore configured for interfacing directly to another mobile device which is located within a transmission range of the mobile device. A direct communication between two mobile devices means in this context that the two mobile devices are communicating wirelessly without using a base station of a cellular communication network. In the cellular communication networks a communication between two mobile devices is realized by establishing a wireless link between a first communication device and a base station in the proximity of the first communication device, and establishing a wireless link between the second communication device and a base station in the proximity of the second communication device. The base stations are communicating among each other via wired or wireless links. In contrast to this, a direct interfacing between the mobile device and another mobile device does not include the communication via a base station. The mobile device and the other mobile device have to be located within a transmission range of the radio communication among each other. Such a direct interfacing is also called device-to-device communication or direct communication. According to the method, the mobile device detects at least one reachable cell of the communication network within the transmission range of the mobile device. In other words, the mobile device detects at least one base station within the transmission range of the mobile device. For detecting a base station, a transmission range of the mobile device may be defined for example by a receiver sensitivity of the interface unit. The mobile device may detect a plurality of base stations within the transmission range of the mobile device while the mobile device is registered at only one of the detected base stations for communication. According to the method, a cell information concerning the at least one detected cell is transmitted to the other mobile device via the direct communication. The cell information may comprise for example a cell identifier or an identifier of the base station related to the cell. This allows control signaling information to be directly shared between the mobile devices within certain proximity in order to improve total system capability or performance. For example, when the other mobile device wants to change the cell, it may use the cell information concerning the at least one cell received from the mobile device for selecting a new cell during cell change.

According to an embodiment, the cell information comprises a signal strength of the at least one cell received at the mobile device. When the other mobile device receives cell information from a plurality of mobile devices in its proximity, and each cell information comprises a corresponding signal strength, the other mobile device may select a suitable cell during cell change based on the signal strength.

According to a further embodiment, the cell information comprises a cell identifier of the at least one cell. In case a macro base station is not transmitting correct information on relevant neighbor cell identifications to the base stations, the other mobile device may receive correct cell identifier information via direct device-to-device communication facilitating a cell change of the other mobile device.

According to another embodiment, the cell information is broadcasted from the mobile device to other mobile devices in a proximity of the mobile device. By using a broadcast transmission method for distributing the cell information determined by the mobile device, the cell information may be received by a plurality of other mobile devices at the same time which may reduce the required number of transmissions and furthermore the mobile device does not have to set up individual communication connections to the other mobile devices in its proximity.

According to another aspect of the present invention, a method for operating a mobile device is provided. The mobile device comprises an interface unit for interfacing to a cellular communication network comprising a plurality of cells and for interfacing directly to another mobile device within a radio transmission range of the mobile device. According to the method, a cell information is received directly from the other mobile device. The cell information comprises information concerning at least one cell of the communication network within a transmission range of the other mobile device. Depending on the cell information, a cell of the communication network is selected. By receiving cell information directly from other mobile devices, the mobile device may consider this cell information during a cell change for registering at a new cell of the cellular communication network. Thus, the mobile device gets an information about cells in a proximity of the mobile device which can be used to extend for example information received from a base station publishing candidate neighbor cell lists to the mobile devices. Especially in cases where the above-described Automatic Neighbor Reporting (ANR) functionality is not implemented or is updated too slowly by the base stations, the mobile device gets information directly from other mobile devices to find suitable cells for a cell change and to avoid interference from unknown cells.

According to an embodiment, the mobile device interfaces to a cell of the cellular communication network and receives a communication resource information from the interfaced cell. In other words, the mobile devices registers at a base station of a cell in which the mobile device is located. Then, the mobile device receives the communication resource information from the base station. The communication resource information provides information enabling the direct communication between the mobile device and other mobile devices. The communication resource information may comprise for example a time slot information defining a time slot for transmitting the cell information directly from the mobile device to another mobile device, a frequency information defining a transmission frequency for transmitting the cell information directly from the mobile device to another mobile device, or a signal power information defining an allowed signal output power for transmitting the cell information directly from the mobile device to another mobile device. Thus, the base station has control of the communication between the mobile devices and can avoid interference of communications between mobile devices and the base station. Furthermore, the base station may allow or inhibit communication between the mobile devices. Furthermore, the communication resource information may be aligned among different cells and different base stations thus enabling a direct communication between mobile devices within one cell or located in different cells without interfering with other cell communication.

According to a further aspect of the present invention, a method for operating a base station of a cell of a cellular communication network is provided. The base station comprises an interface unit for interfacing to a mobile device. According to the method, a communication resource information is transmitted to the mobile device. The communication resource information provides information for enabling a direct communication between the mobile device and another mobile device for transmitting a cell information directly from the mobile device to the other mobile device. The cell information comprises information concerning at least one cell of the communication network within a receive or transmission range of the mobile device. As defined above, the communication resource information may comprise for example a time slot information, a frequency information or a signal power information. By use of the above-described method, the base station enables a direct communication between mobile devices by allocating a communication resource for the direct communication between the mobile devices. By administering the communication resource information by the base station, the base station can control the direct communication such that other communication within the cell of the base station or neighboring cells is not disturbed. Furthermore, the base station can allow or inhibit the direct communication between the mobile devices. When the direct communication between the mobile devices is enabled, cell information can be exchanged between the mobile devices enabling the mobile devices to find suitable cells to analyze in case current signal quality too low and thus supporting a cell change of the mobile devices.

According to a further aspect of the present invention, a mobile device comprising an interface unit and a processing unit is provided. The interface unit is configured to interface to a cellular communication network comprising a plurality of cells and to interface directly to another mobile device which is located within a radio transmission range of the mobile device. The processing unit is configured to detect at least one cell of the communication network within the transmission range of the mobile device, and to transmit a cell information concerning the detected at least one cell to the other mobile device via a direct communication between the mobile device and the other mobile device.

Furthermore, according to the present invention, a mobile device comprising a processing unit and an interface unit for interfacing to a cellular communication network comprising a plurality of cells and for interfacing directly to another mobile device located within a transmission range of the mobile device. The processing unit is configured to receive a cell information directly from the other mobile device, and to select a cell for interfacing depending on the cell information. The cell information comprises information concerning at least one cell of the communication network within a transmission range of the other mobile device.

Thus, the above-described mobile device gains information about the identity of neighboring cells within the same geographical area. Hence, a cell change is supported, when the mobile devices are moving from one cell to another cell.

According to an embodiment, the mobile device is configured to perform the method steps of the embodiments of the above-described method. Furthermore, the mobile device may comprise for example a mobile phone, a personal digital assistant, a mobile music player, a tablet computer, a laptop computer, a notebook computer, or a navigation system.

According to yet another aspect of the present invention, a base station of a cellular communication network is provided. The base station comprises an interface unit for interfacing to a mobile device, and a processing unit configured to transmit a communication resource information to the mobile device. The communication resource information provides information for enabling a direct communication between the mobile device and another mobile device for transmitting a cell information directly from the mobile device to the other mobile device. The cell information comprises information concerning at least one cell of the communication network within a transmission range of the mobile device.

According to an embodiment, the base station is configured to perform the above-described method and comprises therefore also the above-described advantages.

According to another aspect of the present invention, a combination of at least one of the above-described mobile devices and the above-described base station is provided. This combination of mobile devices and base stations enables mobile devices within proximity of each other to transmit information directly to each other in order to inform about neighbor cell information. Furthermore, the base station has control of the communication between the mobile devices avoiding disturbances of the communication within the cell or within a neighboring cell.

Although specific features described in the above summary and the following detailed description are described in connection with specific embodiments and aspects, it is to be understood that the features of the embodiments and aspects may be combined with each other unless specifically noted otherwise.

BRIEF DESCRIPTION OF THE DRAWINGS

The invention will now be described in more detail with reference to the accompanying drawings.

DETAILED DESCRIPTION OF PREFERRED EMBODIMENTS

In the following, exemplary embodiments of the invention will be described in more detail. It has to be understood that the features of the various exemplary embodiments described herein may be combined with each other unless specifically noted otherwise. Same reference signs in the various drawings refer to similar or identical components.

Figure 2:
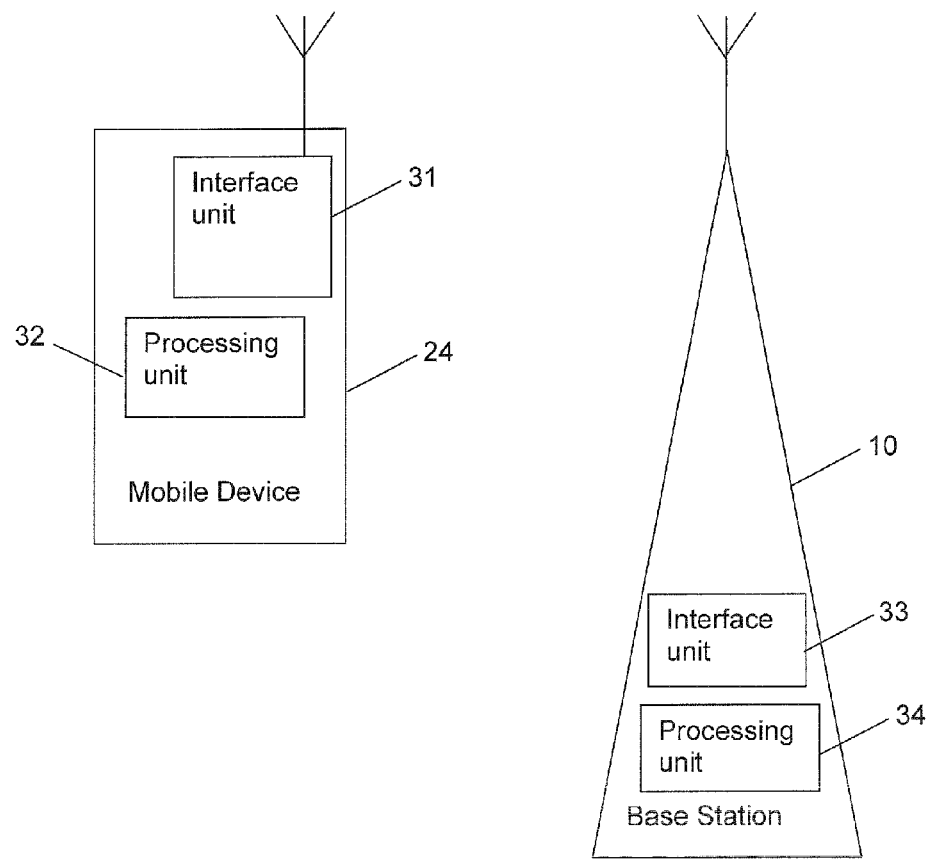
FIG. 2 shows schematically a mobile device and a base station according to embodiments of the present invention.

FIG. 2 shows a mobile device 24 and a base station 10 according to embodiments of the present invention.

Figure 1:
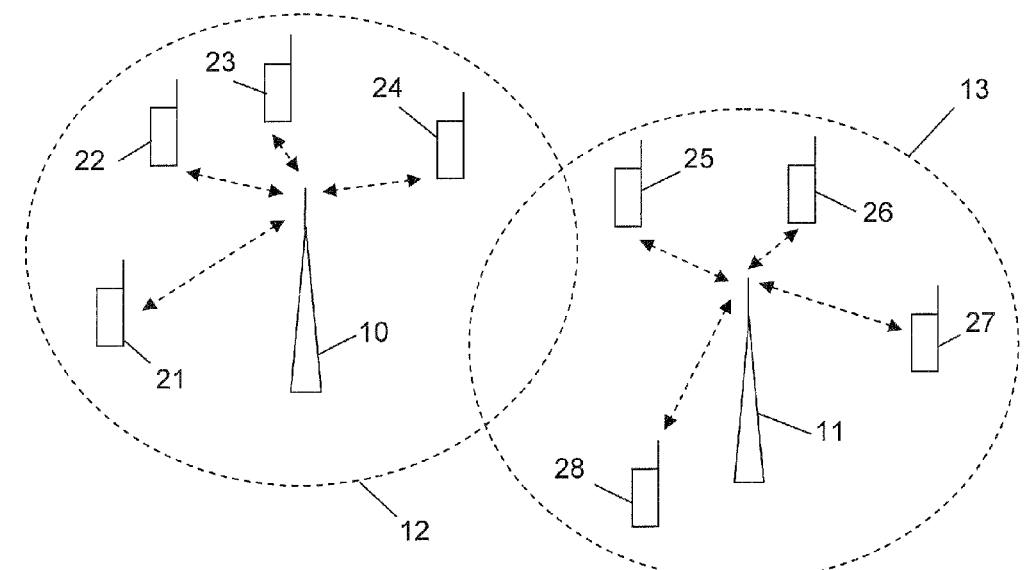
FIG. 1 shows mobile devices in two cells of a cellular communication network.
Figure 4:
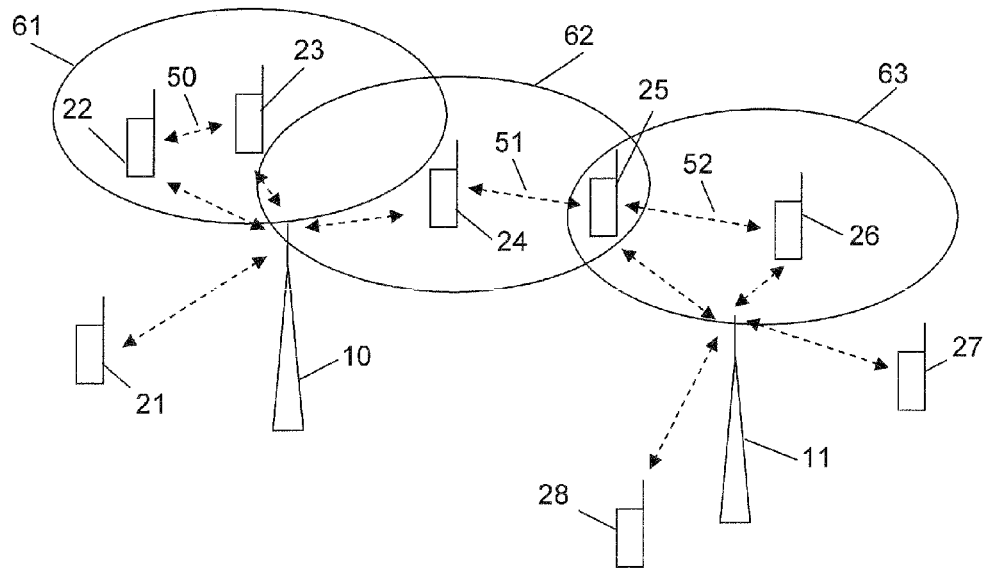
FIG. 4 shows schematically a direct communication between mobile devices within a transmission range of the mobile devices according to an embodiment of the present invention.

The mobile device 24 comprises an interface unit 31 and a processing unit 32. The interface unit 31 is configured for interfacing to a cellular communication network comprising a plurality of cells, for example the cells 12, 13 as shown in FIG. 1, and for interfacing directly to another mobile device within a transmission range of the mobile device 24. For example, the mobile device 25 may be within the transmission range 62 of the mobile device 24 as shown in FIG. 4. Thus, a direct communication 51 between the mobile devices 24 and 25 can be established via the interface unit 31. The processing unit 32 is configured to detect at least one cell of the communication network within the transmission range of the mobile device 24, and to transmit a cell information concerning the detected at least one cell to another mobile device via a direct communication. For example, the mobile device 24 may detect the cell 12 and transmit a cell information concerning the detected cell 12 to the mobile device 25 via the direct communication 51. The mobile device 25 may have a similar structure as the mobile device 24 and the processing unit of the mobile device 25 is configured to receive the cell information directly from the mobile device 24 and to select a cell for interfacing depending on the received cell information. For example, assuming that the mobile device 25 is registered at cell 13 and receives the cell information concerning the cell 12 directly from mobile device 24. In this case, the mobile device 25 may select the cell 12 to register at as the cell 12 may provide a better signal strength.

The interface unit 31 of the mobile device 24 as well as the interface unit of the mobile device 25 may interface to a cell of the communication network, for example to the cell 12 or 13. The processing unit 32 may receive via the interface unit 31 a communication resource information from the base station related to the interfaced cell, for example from the base station 10 or 11. The communication resource information provides information for enabling the direction communication between the mobile devices 24 and 25. For example, the communication resource information may comprise a time slot information, a frequency information and/or a signal power information for transmitting the cell information directly between the mobile devices 24 and 25. For example, the mobile device 24 may broadcast the cell information via the specified time slot and frequency, and the mobile device 25 may listen on the specified time slot and frequency.

The communication resource information is provided by the base station 10 which comprises an interface unit 33 and a processing unit 34. The interface unit 33 provides a wireless radio communication to the mobile devices within the cell 12 related to the base station 10. The processing unit 34 manages the communication to the mobile devices 21-24 within the cell 12, and provides the communication resource information for the direct communication between the mobile devices.

There may be several reasons for information, especially cell information, being available to a particular mobile device, but not being part of the signaled information from the base station. As described above, one reason may be that the Automatic Neighbor Reporting (ANR) functionality is not used by the base station. But even if the ANR functionality is supported by the base stations, there may be delays and/or filtering functionality that limits the amount of information transmitted to all mobile devices. Furthermore, there may be additional information that is more local of its nature and therefore not suitable to be sent over the whole cell area. For example, this could be information about the strongest available neighbor cell, which naturally will differ over the whole cell area, but which will be very similar for mobile devices within a very close proximity. Such information may be advantageously used for an optimized cell change functionality since it would give a terminal device information which cells are to be searched for at first. This type of additional information may be called Terminal Assisted Automatic Neighbor Reporting (TA-ANR).

Figure 3:
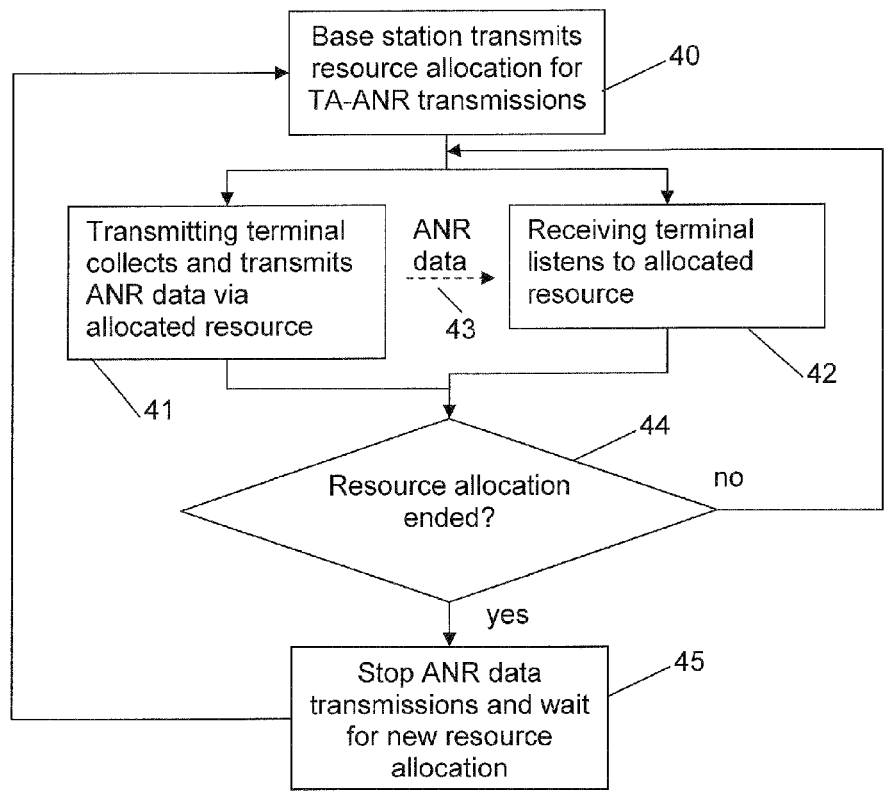
FIG. 3 shows method steps of a method according to an embodiment of the present invention.

FIG. 3 shows method steps of such a Terminal Assisted Automatic Neighbor Reporting technique. A mobile device within a certain area of a cell can either request to get allocated a resource comprising for example a specific time and frequency slot coupled with a certain output power, or a base station can allocate such resources on a more static level and transmit the resource allocation for the direct communication between the mobile devices to the mobile devices (step 40). However, the resources are allocated by the serving base station. A mobile device collects cell information in its proximity and transmits these proximity-based additional information 43 via the available resources to other mobile devices with the purpose to assist the other mobile devices in their cell change procedures (step 41). The additional information 43 may comprise the above-described Terminal Assisted Automatic Neighbor Reporting data. The type of information that can be delivered must be clearly defined, for example by sending one or more different predefined information blocks. Other mobile devices within the proximity of the transmitting mobile device may be informed by the base station on what resources are used for the direct communication and listen to the additional information and improve their cell change capabilities (step 42). In other words, once a mobile device has been allocated communication resource information to transmit proximity-based Terminal Assisted Automatic Neighbor Reporting information, it initiates the activity for collecting data and broadcasts (step 41) its Terminal Assisted Automatic Neighbor Reporting data 43 to terminals within proximity. In step 44 it is decided, if the transmission of Automatic Neighbor Reporting data 43 is continued in steps 41 and 42 or if the Automatic Neighbor Reporting data transmission is stopped in step 45 depending on the resource allocation. If the resource allocation is ended by the base station, the Automatic Neighbor Reporting data transmission is stopped in step 45. Further Automatic Neighbor Reporting transmissions may be initiated, when the base station transmits a new resource allocation for the ANR-transmissions in step 40. In this manner, the base station has full control over the usage of the Terminal Assisted Automatic Neighbor Reporting in terms of allowing the feature and what radio resources to be used.

In connection with FIG. 4, the cell information transmission via a direct communication between mobile devices will be explained by means of examples. The mobile device 23 has a radio transmission range 61, the mobile device 24 has a radio transmission range 62 and the mobile device 26 has a radio transmission range 63. Within the radio transmission range 61 the mobile device 22 is located. Therefore, a direct communication between the mobile devices 22 and 23 may be set up to communicate cell information directly between the mobile devices 22 and 23. The mobile device 25 is located within the radio transmission ranges 62 and 63. Therefore, a direct communication 51 between the mobile devices 24 and 25 as well as a direct communication 52 between the mobile devices 26 and 25 may be established for cell information exchange. Therefore, mobile device 25 is provided with cell information concerning cells 12 and 13 by the mobile devices 24 and 26. Based on this cell information the mobile device 25 can select the most suitable cell to register at.

While exemplary embodiments have been described above, various modifications may be implemented in other embodiments. For example, the detected Automatic Neighbor Reporting data may be sent additional to base stations and distributed by the base station to mobile devices registered at the base station.

The invention claimed is:

1. A method for operating a mobile device, the mobile device comprising an interface unit for interfacing to a cellular communication network comprising a plurality of cells, each of the plurality of cells provided by a base station, and for interfacing directly to another mobile device within a transmission range of the mobile device, the method comprising:

detecting, by the mobile device, at least one reachable cell, provided by a base station, of the communication network within the transmission range of the mobile device, registering the mobile device at the base station, receiving communication resource information from the base station at which the mobile device is registered, the communication resource information providing information for enabling a direct communication between the mobile device and another mobile device, and transmitting cell information concerning the at least one cell to the other mobile device via the direct communication without communication through the base station, wherein the cell information comprises at least one of the group comprising:

a signal strength of the base station received at the mobile device, and a cell identifier of the base station.

2. The method according to claim 1, wherein transmitting the cell information comprises a broadcasting of the cell information.

3. A method for operating a mobile device, the mobile device comprising an interface unit for interfacing to a cellular communication network comprising a plurality of cells, each of the plurality of cells provided by a base station, and for interfacing directly to another mobile device within a transmission range of the mobile device, the method comprising:
  receiving cell information via a direct communication from the other mobile device without communication through the base station, the cell information comprising information concerning at least one cell, provided by a base station, of the communication network within a transmission range of the other mobile device, wherein the direct communication is enabled by registering the other mobile device at a base station and the other mobile device receives communication resource information from the base station at which the other mobile device is registered, the communication resource information providing information for enabling the direct communication between the mobile device and the other mobile device, and
  selecting a cell, provided by a base station, of the communication network for interfacing depending on the cell information, wherein the cell information comprises at least one of the group comprising:
  a signal strength of the base station received at the mobile device, and
  a cell identifier of the base station.

4. The method according to claim 3, further comprising:
  a time slot information defining a time slot for transmitting the cell information directly to the other mobile device,
  a frequency information defining a transmission frequency for transmitting the cell information directly to the other mobile device, and/or
  a signal power information defining an allowed signal output power for transmitting the cell information directly to the other mobile device.

5. A method for operating a base station of a cell of a cellular communication network, the base station comprising an interface unit for interfacing to a mobile device, the method comprising:
  registering the mobile device at the base station, and
  transmitting communication resource information from the base station to the mobile device, the communication resource information providing information for enabling a direct communication between the mobile device and another mobile device for transmitting cell information directly from the mobile device to the other mobile device without communication through the base station, the cell information comprising information concerning at least one cell, provided by a base station, of the communication network within a transmission range of the mobile device, wherein the cell information comprises at least one of the group comprising:
  a signal strength of the base station received at the mobile device, and
  a cell identifier of the base station.

6. The method according to claim 5, wherein the communication resource information comprises at least one information from a group of information comprising:
  a time slot information defining a time slot for transmitting the cell information directly to the other mobile device,
  a frequency information defining a transmission frequency for transmitting the cell information directly to the other mobile device, and/or
  a signal power information defining an allowed signal output power for transmitting the cell information directly to the other mobile device.

7. A mobile device, comprising:
  an interface unit for interfacing to a cellular communication network comprising a plurality of cells, each of the plurality of cells provided by a base station, and for interfacing directly to another mobile device within a transmission range of the mobile device, and
  a processing unit configured to detect at least one cell, provided by a base station, of the communication network within the transmission range of the mobile device, to register the mobile device at the base station, to receive communication resource information from the base station at which the mobile device is registered, the communication resource information providing information for enabling a direct communication between the mobile device and another mobile device, and to transmit cell information concerning the detected at least one cell to the other mobile device via the direct communication without communication through the base station, wherein the cell information comprises at least one of the group comprising:
  a signal strength of the base station received at the mobile device, and
  a cell identifier of the base station.

8. The mobile device according to claim 7, wherein the mobile device comprises at least one device of a group consisting of a mobile phone, a personal digital assistant, a mobile music player, a tablet computer, a laptop computer, a notebook computer, and a navigation system.

9. A mobile device, comprising:
  an interface unit for interfacing to a cellular communication network comprising a plurality of cells, each of the plurality of cells provided by a base station, and for interfacing directly to another mobile device within a transmission range of the mobile device, and
  a processing unit configured to receive cell information via a direct communication from the other mobile device without communication through the base station, the cell information comprising information concerning at least one cell, provided by a base station, of the communication network within a transmission range of the other mobile device, wherein the direct communication is enabled by registering the other mobile device at a base station and the other mobile device receives communication resource information from the base station at which the other mobile device is registered, the communication resource information providing information for enabling the direct communication between the mobile device and the other mobile device, and to select a cell, provided by a base station, for interfacing depending on the cell information, wherein the cell information comprises at least one of the group comprising:
  a signal strength of the base station received at the mobile device, and
  a cell identifier of the base station.

10. The mobile device according to claim 9, wherein the mobile device comprises at least one device of a group consisting of a mobile phone, a personal digital assistant, a mobile music player, a tablet computer, a laptop computer, a notebook computer, and a navigation system.

11. A base station for a cell of a cellular communication network, the base station comprising:
  an interface unit for interfacing to a mobile device, and a processing unit configured to register the mobile device at the base station, and to transmit communication resource information from the base station to the mobile device, the communication resource information providing information for enabling a direct communication between the mobile device and another mobile device for transmitting cell information directly from the mobile device to the other mobile device without communication through the base station, the cell information comprising information concerning at least one cell of the communication network within a transmission range of the mobile device, wherein the cell information comprises at least one of the group comprising:

a signal strength of the base station received at the mobile device, and a cell identifier of the base station.

12. The base station according to claim 11, further comprising:

a time slot information defining a time slot for transmitting the cell information directly to the other mobile device, a frequency information defining a transmission frequency for transmitting the cell information directly to the other mobile device, and/or a signal power information defining an allowed signal output power for transmitting the cell information directly to the other mobile device.

13. A combination of at least one mobile device according to claim 9 and a base station according to claim 11.

14. A combination of at least one mobile device according to claim 7 and a base station according to claim 11.

* * * * *

UNITED STATES PATENT AND TRADEMARK OFFICE
CERTIFICATE OF CORRECTION

PATENT NO. : 9,843,971 B2
APPLICATION NO. : 14/762146
DATED : December 12, 2017
INVENTOR(S) : Rickard Ljung Page 1 of 1

It is certified that error appears in the above-identified patent and that said Letters Patent is hereby corrected as shown below:

On the Title Page

Correct Assignee in item [73], as follows:
[73] Sony Mobile Communications Inc., Tokyo, Japan Signed and Sealed this
Twenty-sixth Day of February, 2019

Andrei Iancu
*Director of the United States Patent and Trademark Office*